United States Patent Office 3,554,763
Patented Jan. 12, 1971

---

3,554,763
PREPARATION OF READY-TO-EAT CEREAL CHARACTERIZED BY A HONEY-GRAHAM FLAVOR
Robert B. Fast, Glen Rock, Bohdan O. Hreschak, Hawthorne, and Clyde E. Spotts, Fair Lawn, N.J., assignors to National Biscuit Company, a corporation of New Jersey
No Drawing. Filed Sept. 7, 1967, Ser. No. 665,999
Int. Cl. A23l *1/10*
U.S. Cl. 99—83   11 Claims

ABSTRACT OF THE DISCLOSURE

A honey-graham flavored ready-to-eat cereal is prepared by partially cooking a syrup comprising liquid honey and sodium bicarbonate together with wheat flour in order to partially gelatinize the starch in the flour. The partially cooked product is cooled, compressed, puffed and dried to an extent sufficient to produce a product having a bulk density of 5–7 pounds per cubic foot.

---

This invention relates to new breakfast cereals, and more specifically to a breakfast food of the type which is cooked by the consumer for a short period of time, before use, by merely adding boiling water and also to an instant ready-to-eat cereal.

Conventional cereals such as, for instance, farina, require cooking for a considerable period of time, in a relatively large volume of water, with frequent stirring to prevent scorching. The time involved and care required have greatly contributed to the development of other varieties of cereals, such as the ready-to-eat type, the quick-cooking cereals, and the instant cereals. The ready-to-eat cereal is mixed with a cold liquid, usually milk, and is eaten immediately, without cooking. The instant cereals hydrate immediately upon addition of boiling water, and require no cooking. The third variety, the quick-cooking cereals, are marketed in a dehydrated condition, and must be cooked in a liquid, usually boiling water, for a short period of time, before eating.

In spite of the convenience and popularity of all these varieties of cereals, several shortcomings exist. For instance, the ready-to-eat cereals must be steamed, passed over heated rolls, or exploded in a moist atmosphere or in a vacuum, to achieve a high degree of gelatinization and hydration, before reaching the consumer. During these steps, manifestly, considerable loss of flavor results.

Also in the case of the instant and quick-cooking cereals available on the market, most of the processes known in the art involve prolonged cooking, prior to reaching the consumer. During this step, considerable loss of natural flavoring agents and valuable nutrients, mainly vitamins and other minerals, occurs. Another disadvantage of most quick-cooking cereals, is that the end products have a tendency to lump and become pasty.

In an attempt to obviate these disadvantages, several suggestions have been made, which have met with at least partial success. U.S. Pat. 3,113,868 described a process for the preparation of cereals which remain paste-free on prolonged cooking, by the incorporation of edible, chemically saturated monoglycerides, in a proportion of 0.3 to 3% of the dry weight of the cereal. The glycerides, according to this patent, are selected from the group containing fatty acid moieties with 8 to 22 carbon atoms. The glycerides are added at least at the time of cooking, but may be added at any stage of the manufacturing process, for instance during roasting or grinding.

The process of U.S. Pat. 2,930,697 covers the production of quick-cooking cereal products, by soaking the grain, flattening and compressing the material, so that the endosperm becomes exposed and water can penetrate more easily, gelatinizing the starch by cooking, and finally drying. It is there stated that, as a result of the controlled gelatinization of the starch granules, the swollen grain can be dried to produce an enlarged porous vesicular structure. One advantage of this process is that loss of vitamins and minerals is reduced, because the grain can be rehydrated in a minimum of hot water and because nutritive integuments adhere to the endosperm and are not lost during the cooking step.

U.S. Pat. 2,999,018 describes a process for the preparation of an instant rolled oat food product, with improved flavor and texture characteristics. The process consists of adding to rolled oats one of the edible plant gums, for instance mucilages, or a synthetic gum, such as carboxymethyl cellulose, whereby the cereal acquires the flavor and texture characteristics of cooked oatmeal, upon the addition of hot water. The resulting product has the consistency and appearance of a porridge.

In spite of the efforts and considerable improvement made, the quick-cooking and instant cereal products available on the market, are not totally satisfactory. One disadvantage is that in the attempt to obtain a precooked cereal, which is reconstituted rapidly in boiling water, as the instant cereals, or which needs only a very short cooking time, as the quick-cooking cereals, the end products lose the granular identity, are pasty, or similar to a porridge, become gelatinous on standing and are inferior in organoleptic properties to the conventional hot cereals. Another drawback common to quick-cooking, instant cooked, as well as ready-to-eat cereals, is that they do not provide sufficient variety of flavors.

One object of this instant invention is to impart to cereal products of the quick-cooking, instant cooked and ready-to-eat variety, the flavor commonly called "graham" or "honey-graham," which is found in some baked goods such as graham crackers or graham bread. Thus one object is to provide a process whereby the characteristic popular flavor of graham products is achieved in breakfast food.

Another object of the invention resides in providing a quick-cooking cereal product which requires the minimum proportion of water of milk during cooking by the ultimate consumer, which has no tendency to lump and cake, even on prolonged standing, which is characterized by unusual stability in texture, and which contains a sufficient amount of sweetening agents so that addition of sugar by the consumer is not needed.

A further object of this invention is to provide a ready-to-eat breakfast cereal with the characteristic "graham" or "honey-graham" flavor, which is light in weight, crisp with light brown, toasted flavor, and appearance, and which does not become soggy upon addition of milk.

Still another object of this instant invention is to prepare cereals from wheat flour rather than from the entire wheat or from fractions of wheat grain. Sereral advantages result from the use of the wheat flour as it will be demonstrated hereinafter. The ingredients are better blended, the starch is uniformly gelatinized, with less cooking time, coagulation and agglomeration are avoided and the texture of the end product is granular rather than pasty.

The term "graham" or "honey-graham" flavor is associated in the art with products prepared by baking, which have a light brown color, with a characteristic nut-like, toasted wheat flavor, having a sweet molasses and honey background. Although some differences exist in the formulations of graham crackers used by the several manufacturers, the essential ingredients of a standard composition are the same, namely, whole wheat flour, sugar, invert syrup or molasses, salt, water and shortening. Some manufacturers use honey instead of invert syrup and molasses, to improve the flavor. Sufficient sodium bicarbonate is added in conventional graham crackers to adjust the pH of the blend to between 7.2 and 8.0. The length of baking time for graham crackers ranges between 4 and 6 minutes, that is, somewhat longer than most other crackers, for instance soda crackers, which only require between 3 and 5 minutes.

It has been a common belief in the art that the characteristic graham flavor defined above, could not be achieved except in foodstuffs prepared by baking. It has also been a common belief that whole wheat flour is an essential ingredient of foodstuffs characterized by the "graham" flavor. Thus, it has been surprising, as it will be demonstrated below, that, according to the process of this invention, a quick-cooking cereal characterized by the popular and distinctive flavor known as graham flavor, may be prepared without baking. It has also been surprising that the characteristic flavor may be achieved by substituting white wheat flour for whole wheat flour, in whole or in part.

In summary, this invention present novel features both as a composition of matter, and as a process. As a composition of matter, the invention comprises certain ingredients in specified proportions, as it will be described below, which give a quick-cooking, instant and a ready-to-eat cereal having the characteristic honey-graham flavor. From a process point of view, this invention comprises certain steps of mixing, heating, drying, and in the case of the ready-to-eat cereals, advancement in a closed compression zone and sudden pressure release, which, when taken in the sequence and carried out in the manner as described, produce the novel products.

According to the conventional processes for the preparation of ready-to-eat cereals, the cereal grains either in grit or dough form, are cooked at a moisture level ranging from 30 to 50%, for at least one hour, in the presence of flavoring agents such as sugar, salt, and malt. The proportion of the sweetening agents is, at the most, 5 to 10%. Cooking is customarily carried out by subjecting the ingredients to steam in a pressure cooker, where the material becomes gelatinized under pressure ranging from 10 to 100 p.s.i.g. The cooked material is then dried, tempered and flaked.

One feature of this instant invention resides in the finding that, by the use of wheat flour, rather than the wheat grain, it is possible to shorten the cooking period, as it will be described more fully hereinafter. Another feature of the invention resides in the finding that a substantial proportion of sweetening agents, sugar, honey, molasses, invert syrup, may be incorporated into the composition, in the proportion between 27 and 35% of the total composition, without destroying their natural flavor because of the shorter cooking time.

Still another feature of this invention is to keep the pH of the composition between 6.5 and 8. Without speculating upon the mechanism of the reaction and the factors contributing to the development of the honey-graham flavor in the finished products, the pH range between 6.5 and 8 is essential to the development of the desired flavor.

The composition in accordance with this instant invention, comprises 30 parts of flour, between 8 and 11 parts of sugar, preferably 9 parts of sugar, between 3 and 6 parts of liquid honey, preferably 4 parts, between 0.2 and 0.3 part of salt, between 0.1 and 0.2 part of sodium bicarbonate, and between 2 and 4 parts of water. The use of flavoring agents such as vanillin, in amount between 0.003 and 0.004 part, is optional. The flour is preferably straight grade flour, of protein content between 8.5 and 11. A portion of the flour, 50% of the total amount, may be whole wheat flour, with the remainder being white wheat flour. Although it is also possible to use all white wheat flour, without substantially changing the flavor and the properties of the finished food products, in accordance with the preferred embodiment of this invention, about 10% of the total amount of flour is whole wheat flour.

Sorbitol may be used, in partial replacement of the sugar, up to 4–5 parts of sorbitol, in combination with about 5 parts of sugar. Although honey gives the best product, invert syrup or molasses may be used in partial replacement of honey, up to 50% of the honey.

According to the preferred embodiment of the invention, a binder is added, in amount between 0.3 and 0.6 part per 30 parts of flour. The binder may be starch or an edible polysaccharide gum, such as the plant mucilages, agar, algin or gum arabic, or mixtures of same. The use of the binder is advantageous to give a product with the proper consistency and desirable texture, after cooking by the ultimate consumer.

Although it is possible to mix all the ingredients together, it is preferable to add the binder to the flour, if a binder is used, and separately add honey, molasses, if both are used, sugar or sorbitol, sodium bicarbonate, salt and water, to form a syrup, and then add the syrup to the flour and binder. The material is then blended under mechanical mixing, for a period of time between 1 and 10 minutes, depending upon the size of the mixing unit, the amount of material, and the rate of mixing. Mixing is continued until the material acquires a uniform light gray color.

The blend is then transferred to a pressure cooker or autoclave, where it is cooked for a period of 2 to 30 minutes, under a pressure of 5 to 100 pounds per square inch, and a temperature between 212° and 337° F. According to the preferred embodiment of the invention, the pressure is kept between 15 and 18 pounds per square inch, for 4 to 6 minutes, at a temperature of 250° F. to 255° F. Although it is possible to cook for a longer time, that is, 30 minutes at a lower temperature, about 212° F., and lower pressure, about 5 pounds per square inch, prolonged cooking is disadvantageous because it affects the honey-graham flavor and makes the product more pasty. Cooking is stopped when the material has changed color from light gray to a tan color, at which point the starch is partially gelatinized, to the extent of between 60 and 75%, and the flour has reached the point of incipient cooking.

After cooking, the moisture content is between 15 and 30%, preferably 20 to 25%. The mass is then passed through a lump breaker, to break the heavy lumps, and transferred to a cooling zone.

After the material has been cooled to a temperature of 130°–150° F., the mass is dried until the moisture content ranges, preferably, between 4 and 8%, although a range of 2 to 12% is still satisfactory. For the purpose of drying, any apparatus of a suitable type may be used, provided the material may be dried in a period of 2 to 3 hours, at a temperature of 200°–250° F., or 48 hours at room temperature, or 45 minutes at 375° F. It is also possible to apply an infrared or high-frequency drying treatment. During the drying and after the drying, lumps, if any, in the granular mass, may be loosened up by means of breakers.

After drying, the material is conveyed to a grinding machine. In the first stage, the major part of the material is ground and in the second stage, the coarser material is removed by screening, so that the fines or dust-like particles are removed. The product with a particle size between 0.2 and 3 mm., preferably between 0.5 and 1 mm., is retained. The bulk density of the material is 40 pounds per cubic foot. The material is in granular form. The material is then ready for packaging. In proper containers, and with a small amount of antioxidants, for instance butylated hydroxytoluene, commonly called BHT, the cereal product, prepared as described, may be stored for a period of six months, without deterioration. Without antioxidants, the material may be stored for as long as two months, with no loss of the characteristic flavor.

The total sugar content of the material dried to a moisture content between 2 and 10%, is 22 to 26%. If higher concentration of sweetening agents is used in the first step, the total sugar content, after drying, may be as high as 30%.

The preparation of the ready-to-eat cereal with the characteristic honey-graham flavor will now be described in detail. The material, prepared as described above, of bulk density 40 pounds per cubic foot, is brought to a moisture content between 12% and 14%, and is plasticized to be converted into a light, highly expanded and tender product. For this purpose, it is continuously fed into an extrusion zone, where it is heated under pressure to a temperature of 275°–425° F. The extruder is a hollow cylinder with the exit end of smaller diameter than the inlet end. It is provided with an internal rotating screw having threads of decreasing pitch towards the exit end. The cylinder may be heated either electrically or by means of a liquid circulating through the outer jacket. The material is advanced mechanically under pressure towards the exit end of the cylinder, while the inner temperature reaches a minimum of 212° F. The permissible temperature range is 212°–480° F., but the preferred temperature range is 275°–425° F. A very tender ready-to-eat cereal product is obtained with a residence time in the extrusion zone of 5–30 seconds, preferably 8–12 seconds.

The dough is then forced through a die which may be of any shape. According to the preferred embodiment of the invention, it consists of a plurality of closely adjacent orifices from which the material is discharged in the form of a plurality of strands. When the strands issue from the extruder to room temperature and normal pressure, considerable expansion occurs to a size about 7 times the size of the original dough. The moisture content is 5–11%, preferably 7–9%. The strands then pass progressively through a cutting device which pinches off sections of predetermined length, and the material is brought onto a drying oven, where the moisture content is reduced to about 2%. Drying is achieved in a period of 25 minutes at 200° F. or 7 minutes at 350° F. In this manner, the material, which before extrusion, is granular, not edible unless it is further cooked, and of a bulk density about 40 pounds per cubic foot, is converted into a ready-to eat material, of tender, porous structure, and of bulk density about 5–7 pounds per cubic foot. The finished product is a ready-to-eat cereal with an attractive palatable appearance, light in weight, crisp and with the characteristic nutty toasted flavor of graham products. The finished goods contain between 22 and 30% of sweetening agents, and absorb milk very slowly, a property which permits the goods to remain crisp and platable, during consumption.

For the sake of clarity, the following examples are described in detail hereinbelow. It will be understood, however, that the examples are purely illustrative, and that the invention is not to be considered as limited to the particular ingredients and operating data given therein, the intention being to cover all the modifications and equivalents of the process within the scope of the appended claims.

EXAMPLE 1

Quick-cooking cereal.—To 9 pounds of sugar, in a vessel of 25 gallon capacity, 2 pounds of water were added. To the syrup thus formed, were added 2 pounds of molasses, 2 pounds of liquid honey, 6 ounces of salt and 3 ounces of sodium bicarbonate. The resulting syrup was then added to a blend of 15 pounds of white wheat flour, 15 pounds of whole wheat flour, and 9 ounces of pregelatinized starch. The ingredients were blended by mixing 5 minutes in a planetary mixer, under mechanical stirring at 65 r.p.m. The material, which had acquired a light gray color, was transferred to an autoclave where it was kept 5 minutes under 18 pounds steam pressure, after which time the material changed to a light tan color. The temperature of the product, as it emerged from the cooker, was 250° F. The product was cooled to a temperature of 140° F., and then deposited in a moderately thick bed, 1.5–6 inches thick, on a traveling screen and dried in two stages. In the first stage, air at room temperature was applied for 15 minutes, and in the second stage, air at 370° F., was applied for 40 minutes. Moderate vibration was applied during drying, to break up the agglomerates. The product, after drying to a moisture content of 6%, was comminuted and the material of particle size between 0.2 and 3 mm. was packaged. The total sugar content was 25.8%.

After boiling in water for two minutes, the product, prepared as described, may be eaten without additional sweetening agent, with or without milk.

Many variations of the process are possible within the scope of the invention. For instance, the above described process was repeated using 3 pounds of sorbitol and 3 pounds of sugar. The flavor of the finished goods was not substantially affected. The sugar content of the product ranged between 25 and 26%. In some runs, whole wheat flour was totally eliminated, and substituted with white wheat flour.

EXAMPLE 2

Instant cooked cereal.—To 9 pounds of sugar, in a vessel of 25 gallon capacity, 2 pounds of water were added. To the syrup thus formed, were added 2 pounds of molasses, 2 pounds of liquid honey, 6 ounces of salt and 3 ounces of sodium bicarbonate. The resulting syrup was then added to a blend of 15 pounds of white wheat flour, 15 pounds of whole wheat flour, and 9 ounces of pregelatinized starch. The ingredients were blended by mixing 5 minutes in a planetary mixer, under mechanical stirring at 65 r.p.m. The material, which had acquired a light gray color was transferred to an autoclave where it was kept 5 minutes under 18 pounds steam pressure, after which time the material changed to a light tan color. The temperature of the product, as it emerged from the cooker, was 250° F. The product was cooled to a temperature of 140° F., and then deposited in a moderately thick bed, 1.5–6 inches thick, on a traveling screen and dried in two stages. In the first stage, air at room temperature was applied for 15 minutes, and in the second stage, air at 370° F., was applied for 40 minutes. Moderate vibration was applied during drying, to break up the agglomerates. The product, after drying to a moisture content of 6%, was comminuted and the material of particle size between 0.2 and 0.9 mm. was packaged. The total sugar content was 25.8%.

After boiling in water for two minutes, the product, prepared as described, may be eaten without additional sweetening agent, with or without milk.

Many variations of the process are possible within the scope of the invention. For instance, the above described process was repeated, using 3 pounds of sorbitol and 3 pounds of sugar. The flavor of the finished goods was not substantially affected. The sugar content of the product ranged between 25 and 26%. In some runs, whole wheat flour was totally eliminated, and substituted with white wheat flour.

EXAMPLE 3

Ready-to-eat cereal.—The material, prepared as described in Example 1, of 6% moisture content, was fed at the rate of 450 pounds per hours, into an extruder of about 6 inch diameter and 4 feet length, with sufficient water to raise the moisture content to 13.8%. Heat generated in the extruder, reaching a temperature of 325° F. The material, as it emerged from the die, expanded to a light crisp strand, to about seven times the size of the original dough, and it was then cut into individual portions. The moisture content at the discharge end of the extruder, was 9.1%. After drying for four minutes at 400° F., the moisture content of the finished product was 2.1%. The bulk density was 7 pounds per cubic foot. The product was crisp, of light cellular texture, and had an excellent nutty, toasted flavor. It absorbed milk slowly and remained crisp and of attractive appearance.

It is manifest that by this invention, two novel varieties of breakfast cereals are provided which are characterized by the flavor of graham products, that is a nutty toasted flavor, with a sweet background. The quick-cooking product, prepared according to the instant invention, needs between 1 and 4 minutes cooking by the ultimate consumer before eating, depending upon the particle size and individual taste. This final step is preferably conducted by adding one part by volume of the product prepared as described above, to one part by volume of boiling water, stirring and allowing to simmer. The amount of water may be increased to three and one-half parts of water by volume, to one part by volume of cereal. A greater proportion of water, however, and longer cooking, are deleterious, because they tend to destroy the characteristic flavor of the product. The final product has an attractive granular texture, and does not become pasty, even after standing 24 hours.

Without in any way limiting the scope of the present invention, by the advancement of theoretical explanation, it is believed that the use of wheat flour rather than wheat kernel, in the manner as described and with the other ingredients at a pH between 6.5 and 8, with sweetening agents in the proportions of at least 27% of the total composition, reduces the cooking time in the first step of the process of preparation, and permits the preparation of the novel quick cooking cereal characterized by the honey-graham flavor, by steps other than baking, with a very high proportion of sweetening agents, in the range between 22 and 30%.

Surprisingly, no deterioration of flavor occurs during the extrusion step, and the same graham flavor is obtained in the ready-to-eat cereal, which provides another novel variety of breakfast food, of very attractive appearance.

We claim:

1. The process for producing a ready-to-eat cereal with a honey-graham flavor, which comprises the steps of:
    (1) mixing between 8 and 11 parts of sugar, between 3 and 6 parts of liquid honey, between 2 and 4 parts of water, between 0.2 and 0.3 part of salt, to form a syrup and adding thereto between 0.1 and 0.2 part of sodium bicarbonate,
    (2) adding said syrup to 30 parts of wheat flour and blending all the ingredients until the material acquires a gray color, the amount of sodium bicarbonate being sufficient to impart a pH between 6.5 and 8 to the total composition,
    (3) cooking for a period of time between 2 and 30 minutes under a steam pressure between 5 and 100 pounds and a temperature between 212° and 337° F., until the flour is partially cooked and the starch is partially gelatinized, and the material changes color from gray to tan,
    (4) cooling to a temperature between 130° and 150° F.,
    (5) advancing said material in a heating and compression zone with sufficient water to bring the moisture content to between 12 and 14% whereby a temperature of 212°–480° F. is reached, and the material is replasticized with a residence time of 5–30 seconds, and
    (6) releasing same material to ambient temperature and pressure, whereby expansion occurs and drying the resulting expanded material to a moisture content of about 2% thus producing a product having a bulk density 5–7 pounds per cubic foot, and containing between 22 and 30% of sweetening agents.

2. The process according to claim 1, wherein a binding agent, which is a member selected from the group consisting of starch, and an edible polysaccharide gum, which is selected from the group consisting of plant mucilages, agar, algin, gum arabic and mixtures thereof, is added to the wheat flour, in amount between 0.3 and 0.6 part prior to adding the syrup from step (1).

3. The process according to claim 1 wherein the pressure during cooking step (3) is between 15 and 18 pounds, the cooking time is between 4 and 6 minutes, and the temperature is between 250° and 255° F.

4. The process according to claim 1 wherein the moisture content after cooking is between 15 and 30%.

5. The process according to claim 1 wherein the wheat flour is white wheat flour.

6. The process according to claim 1 wherein the wheat flour is whole wheat flour.

7. The process according to claim 1 wherein one-half of the wheat flour is whole wheat flour and one-half of the wheat flour is white wheat flour.

8. The process according to claim 1 wherein the sugar is partially replaced by sorbitol, in amount of 4–5 parts of sorbitol to 5 parts of sugar.

9. The process according to claim 1 wherein the temperature in said extrusion reaches 325° F. and after discharging to ambient temperature and pressure, the moisture content is between 5 and 11%.

10. The process according to claim 1 wherein the moisture content after cooking is between 20 and 25%.

11. The process according to claim 1 wherein the honey is partially replaced in an amount of not more than half the amount of said honey by a member selected from the group consisting of molasses, invert syrup and mixtures thereof.

References Cited

UNITED STATES PATENTS

| | | | |
|---|---|---|---|
| 1,175,407 | 3/1916 | Bright | 99—83 |
| 1,186,768 | 6/1916 | Gould | 99—83 |
| 2,890,118 | 6/1959 | Cantor et al. | 99—83 |
| 2,930,697 | 3/1960 | Miller | 99—80 |
| 3,113,868 | 12/1963 | Lee | 99—83 |
| 3,464,828 | 9/1969 | Cummisford et al. | 99—82 |
| 3,467,529 | 9/1969 | Muhler | 99—153 |

RAYMOND N. JONES, Primary Examiner